United States Patent
Mattsson et al.

(10) Patent No.: US 10,613,246 B2
(45) Date of Patent: Apr. 7, 2020

(54) JOINT ESTIMATION OF ELECTROMAGNETIC EARTH RESPONSES AND AMBIENT NOISE

(71) Applicant: PGS Geophysical AS, Oslo (NO)

(72) Inventors: Johan Mattsson, Kista (SE); Peter Lindqvist, Kista (SE); Erik Björnemo, Kista (SE)

(73) Assignee: PGS Geophysical AS, Oslo (NO)

( * ) Notice: Subject to any disclaimer, the term of this patent is extended or adjusted under 35 U.S.C. 154(b) by 244 days.

(21) Appl. No.: 15/502,146

(22) PCT Filed: Aug. 18, 2015

(86) PCT No.: PCT/EP2015/068932
§ 371 (c)(1),
(2) Date: Feb. 6, 2017

(87) PCT Pub. No.: WO2016/030228
PCT Pub. Date: Mar. 3, 2016

(65) Prior Publication Data
US 2017/0227668 A1      Aug. 10, 2017

Related U.S. Application Data

(60) Provisional application No. 62/043,984, filed on Aug. 29, 2014.

(51) Int. Cl.
*G01V 3/38* (2006.01)
*G01V 3/08* (2006.01)
*G01V 3/12* (2006.01)
*G01V 3/15* (2006.01)

(52) U.S. Cl.
CPC ............... *G01V 3/38* (2013.01); *G01V 3/08* (2013.01); *G01V 3/12* (2013.01); *G01V 3/15* (2013.01)

(58) Field of Classification Search
CPC . G01V 3/08; G01V 3/12; G01V 3/083; G01V 3/081; G06F 17/5009
See application file for complete search history.

(56) References Cited

U.S. PATENT DOCUMENTS

| | | | |
|---|---|---|---|
| 6,914,433 B2 | 7/2005 | Wright et al. | |
| 7,142,481 B1 | 11/2006 | Metzbower et al. | |
| 7,277,806 B2 | 10/2007 | Lu et al. | |

(Continued)

OTHER PUBLICATIONS

EPO Examination Report for Application No. 15759665.1 dated Feb. 27, 2018.

(Continued)

*Primary Examiner* — Elias Desta

(57) ABSTRACT

A method and system for estimation of electromagnetic earth responses in a marine electromagnetic survey. A method may comprise estimating initial values of the electromagnetic earth responses and ambient noise applicable to the marine electromagnetic survey; and processing electromagnetic data based on the initial values of the electromagnetic earth responses and the ambient noise to obtain a joint estimation of updated values of the electromagnetic earth responses and the ambient noise, wherein the electromagnetic data was acquired with one or more electromagnetic sensors, wherein the electromagnetic data contains measurements of an electromagnetic field.

22 Claims, 4 Drawing Sheets

(56) References Cited

U.S. PATENT DOCUMENTS

| | | | |
|---|---|---|---|
| 7,536,262 B2 | 5/2009 | Hornbostel | |
| 7,822,562 B2 | 10/2010 | Dennis | |
| 7,894,989 B2* | 2/2011 | Srnka | G01V 3/12 324/329 |
| 7,957,904 B2 | 6/2011 | Ziolkowski et al. | |
| 8,035,393 B2* | 10/2011 | Tenghamn | G01V 3/083 324/365 |
| 8,275,592 B2 | 9/2012 | Lovatini et al. | |
| 8,754,649 B2 | 6/2014 | Sudow et al. | |
| 2007/0061078 A1 | 3/2007 | Lu et al. | |
| 2007/0239403 A1 | 10/2007 | Hornbostel et al. | |
| 2009/0254320 A1 | 10/2009 | Lovatini et al. | |
| 2010/0057366 A1 | 3/2010 | Wright et al. | |
| 2010/0163242 A1 | 7/2010 | Dennis et al. | |
| 2014/0207379 A1 | 7/2014 | Bjornemo | |

OTHER PUBLICATIONS

International Search Report and Written Opinion for International Application No. PCT/EP2015/068932 dated Jan. 12, 2015.

System Identification, Theory for the User, Lennart Ljung, Prentice-Hall, 1987, ISBN 0-13-881640-9, pp. 212-213 and 361-364 dated 1987.

Kalman Filter-Dased Architectures for Interference Excision, Brian Kozminchuk, Defense Research Establishment Ottowa, Dec. 1991.

An HMM Approach to Adaptice DeModulation of QAM Signals in Fading Channels, Collings et al., 1994.

A GPS Carrier Phase Processor for Real-Time High Dynamics Tracking, Sennott et al., Jan. 2007.

Tracking of Time-Varying Mobile Radio Channels—Part I: The Wiener LMS Algorithm, Lindbom et al, Dec. 2001.

* cited by examiner

JOINT ESTIMATION OF ELECTROMAGNETIC EARTH RESPONSES AND AMBIENT NOISE

BACKGROUND

The present disclosure relates to suppression of noise in marine electromagnetic surveying and, more particularly, to a method and system for suppression of noise that includes combining the estimation of electromagnetic earth responses and ambient noise into a technique that makes use of models for both contributions.

One type of marine geophysical surveying includes marine electromagnetic surveying, in which geophysical data may be collected or acquired from below the Earth's surface. Marine electromagnetic surveying is used, among other purposes, to infer spatial distribution of electrical conductivity of formations below the bottom of a body of water, such as a lake or ocean. The spatial distribution of conductivity is used to assist in determining the presence of hydrocarbon-bearing formations in the subsurface, potentially resulting in cost saving by better targeted drilling operations. Marine electromagnetic surveying generally includes inducing an electromagnetic field in the subsurface formations and measuring one or more parameters related to a response of the subsurface formations to the induced electromagnetic field. The current may diffuse through the sea water and subsurface formation with an electric potential difference caused by the current measured at some distance away from the electromagnetic energy source. The sensitivity of the potential difference to the sub-surface resistivity structure may depend on the sensor offsets and the source signal frequencies. For example, electromagnetic sensors may be distributed on one or more streamers towed by a survey vessel, located on one or more ocean bottom cables, or fixed at nodes at or near at a water bottom. The ability to invert for the sub-surface resistivity may be limited by a combination of sensitivity to resistivity changes and the signal-to-noise ratio.

Accordingly, there is a need for improved methods for suppressing noise in marine electromagnetic surveying, for example, to improve data quality and enlarge the weather window for marine electromagnetic surveys. An embodiment that may be used to find the best possible or practicable resistivity map of the subsurface to improve hydrocarbon exploration may use an operator, or method, that finds resistivity parameters as close to the true ones as possible or practicable with minimal error. The more information used, such as seismic data, well logs, geological information, etc., at the beginning of the method may allow for an improved estimate of the resistivity parameters. Noise characteristics may be used to further improve the resistivity estimate.

BRIEF DESCRIPTION OF THE DRAWINGS

These drawings illustrate certain aspects of some of the embodiments of the present disclosure and may not be used to limit or define the disclosure.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The present disclosure relates to suppression of noise in marine electromagnetic surveying and, more particularly, to methods and systems for suppression of noise by combining the estimation of electromagnetic earth responses and ambient noise into a single technique that makes use of models for both contributions. One of the many potential advantages of the methods and systems found in the present disclosure may be that data quality from a marine electromagnetic survey may be improved by suppression of recorded noise. In particular, the signal-to-noise ratio in the desired frequency range may be increased by suppression of recorded noise. Yet another potential advantage may be that the disclosed methods and systems may be particularly useful for removal of the swell peak considered as noise so that the weather window for marine electromagnetic surveys may be enlarged as the marine electromagnetic survey may be performed in weather conditions that would have otherwise been impracticable due to noise.

Figure 1:
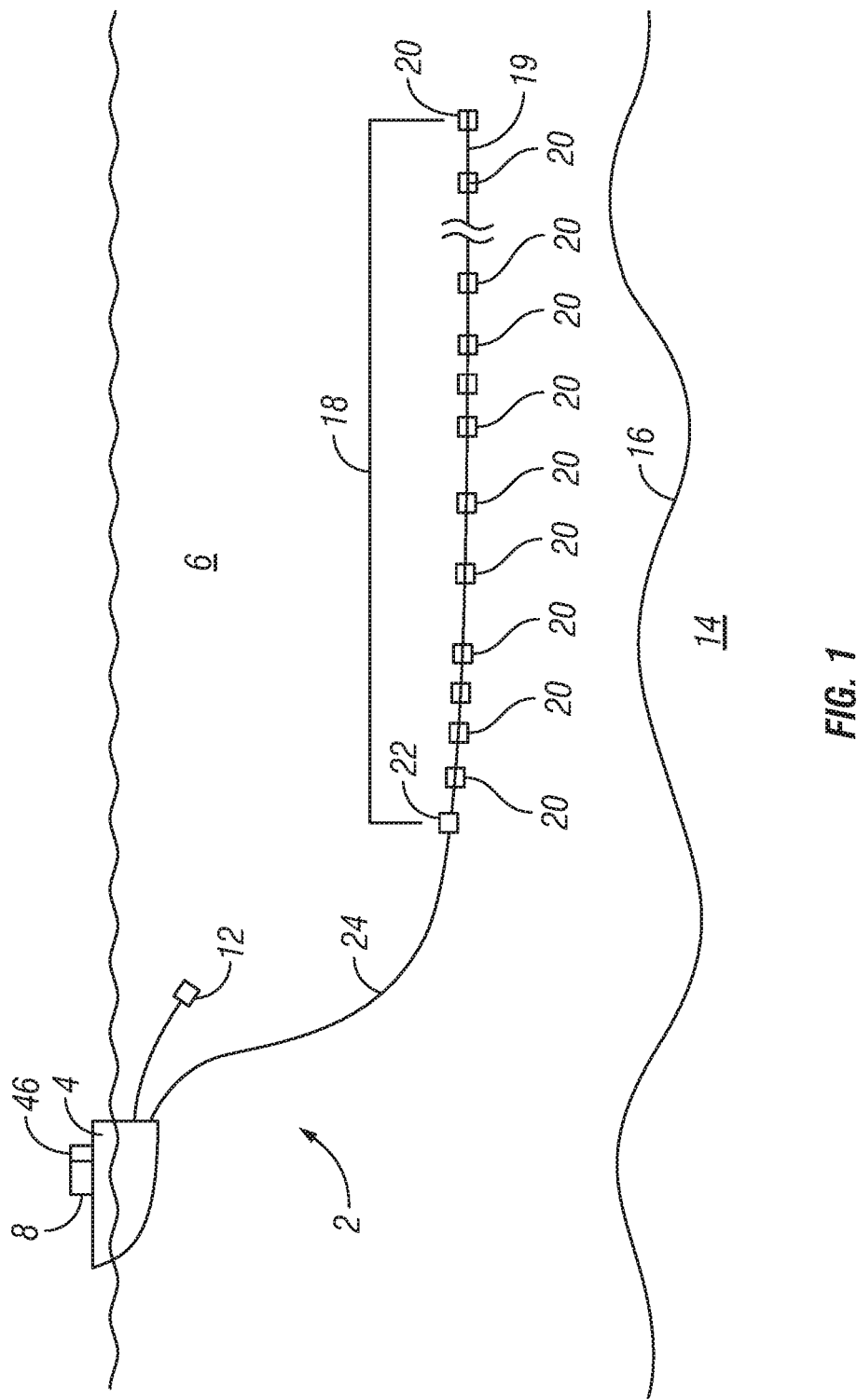
FIG. 1 illustrates an example embodiment of a marine electromagnetic survey system.

Referring now to FIG. 1, a marine electromagnetic survey system 2 may be illustrated in accordance with example embodiments. As illustrated, marine electromagnetic survey system 2 may include a survey vessel 4 moving along the surface of a body of water 6, such as a lake or ocean. Survey vessel 4 may include thereon equipment, shown generally at 8 and referred to for convenience as a "recording system." Recording system 8 may include devices (none shown separately) for navigating survey vessel 4, such as global positioning system ("GPS") receivers, for actuating at least one electromagnetic energy source 12, and for recording signals generated by electromagnetic sensors 20. A data processing system 46, described below with respect to FIG. 4, may be a component of, or separate from, recording system 8.

Survey vessel 4 and/or a different vessel (not shown) may tow at least one electromagnetic energy source 12. In the illustrated embodiment, electromagnetic energy source 12 may be towed above water bottom 16, wherein electromagnetic energy source 12 is disconnected from water bottom 16. Electromagnetic energy source 12 may be any selectively activating source suitable for marine electromagnetic surveying, such as one or more electromagnetic field transmitters. At selected times, electromagnetic energy source 12 may be activated to generate an electromagnetic field that travels downwardly through the body of water 6 and formations 14 below water bottom 16.

In some embodiments, survey vessel 4 may further tow a receiver array 18 comprising a plurality of electromagnetic sensors 20 at spaced apart positions. In the illustrated embodiment, receiver array 18 may be located on a single receiver cable, or "streamer" shown generally at 19, configured to be towable from the survey vessel 4 moving on the surface of the body of water 6. In other embodiments, receiver array 18 may located on multiple streamers displaced horizontally and/or vertically from one another. In alternative embodiments, receiver array 18 may include electromagnetic sensors 20 located on ocean bottom cables and/or nodes, fixed at or near water bottom 16, either in lieu of or in addition to electromagnetic sensors 20 on streamer 19 (or multiple streamers). In still other embodiments, additional electromagnetic sensors 20 may be located on streamers towed by another vessel (not shown). As another alternative, one or more additional sensor streamers (not shown) may be towed behind survey vessel 4, towed behind another vessel (not shown), located on an ocean bottom cable, or on nodes fixed at or near water bottom 16. Non-limiting examples of electromagnetic sensors 20 may include electromagnetic field sensors, such as receiver electrodes (e.g., 34 on FIG. 2) and magnetometers. The type(s) and configurations(s) of electromagnetic sensors 20 are not intended to limit the scope of the disclosure. Without limitation, electromagnetic sensors 20 may be used, for example, to acquire electromagnetic data, such as measurements of the electromagnetic response of formations 14 below water bottom 16. Electromagnetic sensors 20 may measure one or more various electric field properties, such as voltage, magnetic field amplitude, and/or magnetic field gradient.

Streamer 19 may be coupled at its forward end (with respect to direction of movement of the survey vessel 4) to a termination 22 which may couple the streamer 19 to a lead-in cable 24. Lead-in cable 24 may transmit towing force, power, and/or signals between survey vessel 4 and streamer 19. While not illustrated, streamer 19 may include a number of different devices in addition to electromagnetic sensors 20, such as lateral force and depth control devices (e.g., birds having variable incidence wings) to regulate streamer depth, seismic sensors, depth sensors, velocity sensors, accelerometers, magnetometers, and/or positions sensors, among others. While only a single streamer 19 may be shown, it may be understood that the disclosure is applicable to a receiver array 18 disposed on any number of laterally spaced apart streamers towed by survey vessel 4 and/or any other vessel. For example, in some embodiments, two or more laterally spaced apart streamers may be towed by survey vessel 4. "Lateral" or "laterally," in the present context, means transverse to the direction of the motion of survey vessel 4. Lateral positioning of streamers 4 may be maintained by various towed devices (e.g., deflectors, paravanes, doors, etc.) that may generate lateral force as moved through body of water 6. In some embodiments, multiple laterally spaced apart streamers may be towed by survey vessel 4. Accordingly, the number of streamers and their particular geometric configuration in body of water 6 may not considered a limitation on the scope of the present disclosure.

As previously disclosed, electromagnetic sensors 20 may be used to acquire electromagnetic data. The electromagnetic data may contain measurements of various electric field properties of the electromagnetic field generated as a result of the interaction of the induced electromagnetic field with formations 14 below water bottom 16. The measurement may be, for example, induced voltage, magnetic field amplitude and/or magnetic field gradient, such that the electromagnetic data represent one or more electric field properties. Electromagnetic sensors 20 may acquire electromagnetic data when electromagnetic energy source 12 generates a source signal. The source signal may be single pulses and/or continuous sweeps of electromagnetic energy. A marine electromagnetic survey typically may comprise several lines (paths of travel for survey vessel 4) planned to cover the area under consideration with sufficient spatial sampling density. Each line may be divided into shots, where, for marine electromagnetic surveys, a shot may be a spatial sample point for which an electromagnetic earth response may be estimated, rather than a physical "shot" in the seismic sense. In marine electromagnetic surveys, the source signal may be continuous for the whole line, and may be of a single frequency and/or amplitude, or continuously varying. Each electromagnetic shot thus may comprise one sequence of time domain samples per electromagnetic sensor 20. The source signal from electromagnetic energy source 12 may also be measured separately.

In accordance with an embodiment of the disclosure, a geophysical data product indicative of certain properties of at least one of formations 14 may be produced from the measured electromagnetic signal and response thereto. The geophysical data product may include acquired and/or processed electromagnetic data and may be stored on a non-transitory, tangible machine-readable medium. In some embodiments, the geophysical data product may be produced from the joint estimation of the updated values of the electromagnetic earth responses and the ambient noise. Techniques for the joint estimation will be described in more detail below. The geophysical data product may be produced offshore (i.e., by equipment on a vessel such as survey vessel 4, for example) or onshore (i.e. at a facility on land) either within the United States and/or in another country. If the geophysical data product is produced offshore and/or in another country, it may be imported onshore to a facility in the United States. Once onshore in the United States, further data processing and/or geophysical analysis may be performed on the geophysical data product.

Figure 2:
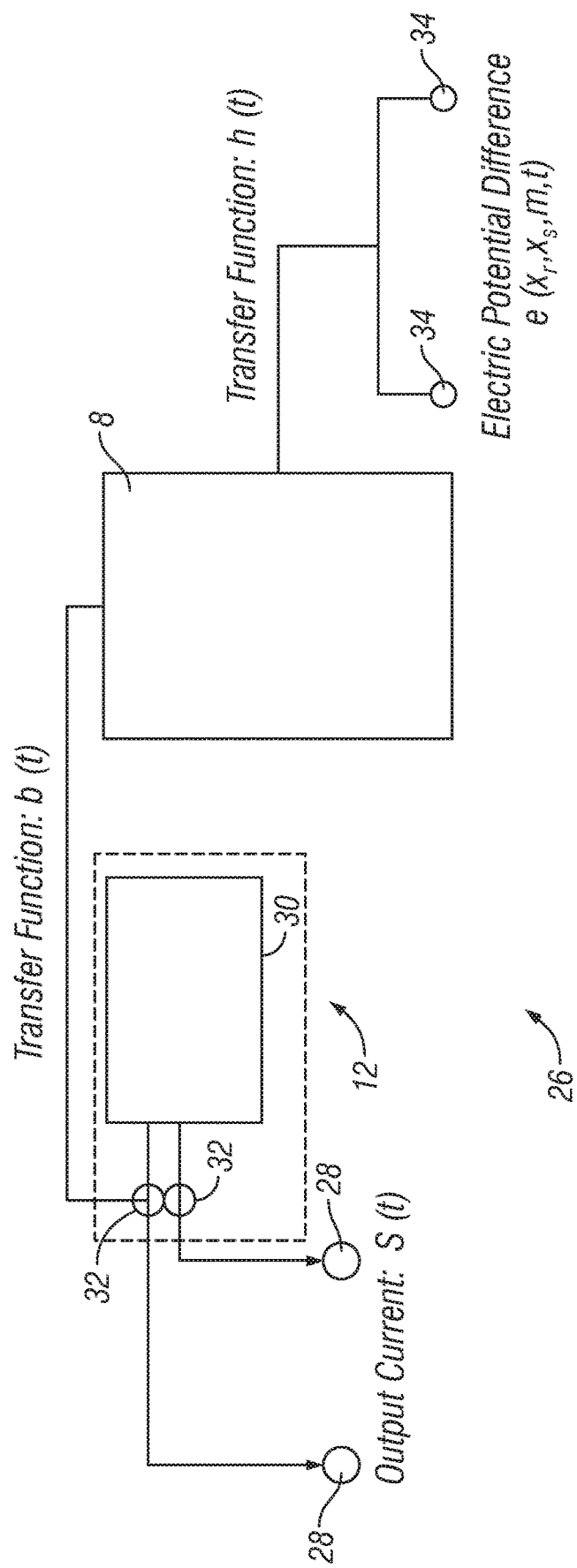
FIG. 2 illustrates a schematic of an example embodiment of electromagnetic measurement system.

A schematic of electromagnetic measurement system 26 is illustrated in FIG. 2. As illustrated, electromagnetic energy source 12 may comprise source electrodes 28 and source electronics 30. An output electric current, quantified as a function of s(t), may be produced by source electronics 30. The output electric current (s) may be a function of time (t). The electric current may be released by source electrodes 28, as illustrated schematically in FIG. 2. Measure points 32, which may be electrodes, for example, may measure the current produced by electromagnetic energy source 12 for comparison to the measured and recorded signal of receiver electrodes 34. Measure points 32 may transmit the measurement information to recording system 8 characterized by a transfer function b(t), which is the impulse response of the measure points 32. The transfer function b(t) may be characterized so that its influence on the data may be compensated for. As illustrated, measure points 32 may be located in or near electromagnetic energy source 12.

The resulting electric potential difference may be measured by receiver electrodes 34 disposed in a receiver array 18 on FIG. 1. Receiver electrodes 34 may be indicated on FIG. 2 by reference number 34. Receiver electrodes 34 may be a component of electromagnetic sensors 20 shown on FIG. 1. As illustrated on FIG. 2, the receiver electrodes 34 may record the electric potential difference as a function $e(x_r,x_s,m,t)$. This may be a function of source position $(x_s)$, electromagnetic sensor position $(x_r)$, electromagnetic properties (m) of the environment (e.g. the subsurface conductivities/resistivities), and time (t). This signal may be transmitted to recording system 8, which may compare the output current, s(t), and electric potential difference, $e(x_s,x_r,m,t)$, to find the impulse response, $g(x_r,x_s,m,t)$. Determining the impulse response may be disclosed in more detail in U.S. Pat. No. 6,914,433, which is incorporated in its entirety by reference.

The ideal, noise-free, physical relation between output current, $s(t)$, and electric potential difference, $e(x_r,x_s,m,t)$, may be provided by the following convolution expression:

$$e(x_r,x_s,m,t)=s(t)*g(x_r,x_s,m,t) \quad (1)$$

Where $g(x_r,x_s,m,t)$ may be the impulse response between source current and receiver potential that reflects the geophysically interesting properties (m) of the subsurface. The Fourier transform of the impulse response, i.e. the frequency response, may be denoted $\breve{g}(x_r,x_s,m,t)$. Electromagnetic earth response may be a general term that refers to earth's frequency response, impulse response, or both. Impulse response and frequency responses may carry the same information about the properties m. A purpose of the electromagnetic measurements may be to estimate this frequency response of the earth as a function of frequency, offset, and spatial position (which may also be referred to as shot points along a survey line). Hence from output current, $s(t)$, and electric potential difference, $e(x_r,x_s,m,t)$, the frequency response or impulse response may be calculated. In the recording system 8, the measured value of source current, $i(t)$, and the measured value of the receiver electrode's 34 potential difference, $u(x_r,x_s,m,t)$, respectively, may be obtained. These are related to output current, $s(t)$, and electric potential difference, $e(x_r,x_s,m,t)$, according to the convolutions:

$$i(t)=b(t)*s(t) \quad (2)$$

$$u(x_r,x_s,m,t)=h(t)*e(x_r,x_s,m,t) \quad (3)$$

where $b(t)$ is the transfer function (impulse response) from the source electrodes 28 to the measurement computer (e.g., recording system 8) and $h(t)$ is the transfer function (impulse response) from receiver electrodes 34 to the measurement computer (e.g., recording system 8). This analysis ignores any noise in both the convolution relations (1), (2), and (3) for simplicity. In order to estimate the electromagnetic earth response (e.g., impulse response, frequency response etc.) from the quantities measured value of source current, $i(t)$, and measure value of potential difference, $u(x_r,x_s,m,t)$, equation (1) may be convolved with transfer functions, $b(t)$ and $h(t)$, while making using of equation (2) to obtain the following:

$$b(t)*u(x_r,x_s,m,t)=h(t)*i(t)*g(x_r,x_s,m,t) \quad (4)$$

The Fourier transform of (4) is as follows:

$$\tilde{b}(f)\tilde{u}(x_r,x_s,f)=\tilde{h}(f)\tilde{i}(f)\tilde{g}(x_r,x_s,f) \quad (5)$$

Dividing (5) by $\tilde{b}(f)$ then yields the following equation:

$$\tilde{u}(x_r,x_s,f)=\tilde{T}(f)\tilde{g}(x_r,x_s,f) \quad (6)$$

$$\tilde{T}(f)=\frac{\tilde{h}(f)\tilde{i}(f)}{\tilde{b}(f)} \quad (7)$$

where $\tilde{T}(f)$ is the Fourier transform of the total system response, $T(t)$, mentioned in the U.S. Pat. No. 6,914,433, noting that total system response is denoted $s(t)$ in U.S. Pat. No. 6,914,333. The inverse Fourier transform of (6) results in the following equation:

$$u(x_r,x_s,m,t)=T(t)*g(x_r,x_s,m,t) \quad (8)$$

In specific embodiments, the frequency response may be obtained from equation (6) according to the following equation:

$$\tilde{g}(x_s,x_r,f)=\frac{\tilde{u}(x_s,x_r,f)}{\tilde{T}(f)} \quad (9)$$

$$\tilde{T}(f)=\frac{\tilde{h}(x_r,f)\tilde{i}(x_s,f)}{\tilde{b}(x_s,f)} \quad (10)$$

where $\tilde{T}(f)$ is non-zero. Equations (9) and (10) are valid for electromagnetic measurement systems with towed streamers, ocean bottom cables, and/or nodes. The differences between systems with towed streamers and systems with nodes are the impulse responses or transfer functions $b(t)$ and $h(t)$. For the towed streamer, the transfer functions may be estimated through calculations based on the behavior of the electronics. Similar calculations should in principal be straightforward to perform for systems with nodes. Both the systems with towed streamers and systems with nodes could also estimate the impulse response $g(x_s,x_r,m,t)$ through equation (8).

For a time-discrete (sampled) and digitized measurement system, each sampling instance may be denoted with an index n so that $t=t_0+n\Delta t$, where $t_0$ may be the initial time and $\Delta t$ may be the sampling interval. The time-discrete notation may then be used to write equation (11) as follows:

$$e(n,m)=s(n)*g(n,m) \quad (11)$$

where the dependence on position x may be implicit in the time index n. Sampled data may be organized as column vectors, $y_{n,N}=[y(n)\ y(n+1)\ \ldots\ y(n+N-1)]^T$, where boldface indicates vector and superscript T denotes transpose and y may be an arbitrary data sample or parameter. Given that the convolution may be truncated with negligible error, it may be expressed in vector notation as follows:

$$e(n,m)=s_{n,-M}{}^T g_{n,-M}(n,m) \quad (12)$$

where M may be the truncation length and $-M$ may denote reverse indexing (old samples) n, n−1, . . . , n−M+1. To complete the vectorised notation for the convolution, capital letter matrices may be used so that data samples [e(n,m), e(n+1,m), . . . e(n+N−1,m)] may be expressed as follows:

$$e_{n,N}(m)=S_{n,(-M,N)}{}^T g_{n,-M}(m) \quad (13)$$

where S may be a convolution matrix constructed so that the matrix-vector multiplication amounts to sampled finite-length convolution. If not required, the size information subscript may be removed to obtain the following equation:

$$e_n(m)=S_n{}^T g_n(m) \quad (14)$$

Measurements may be noisy, and recorded electromagnetic data from receiver electrodes 34 may be expressed as follows:

$$d_n^{(k)}(m)=e_n^{(k)}(m)+q_n^{(k)}=S_n{}^T g_n^{(k)}(m)+q_n^{(k)} \quad (15)$$

where $q_n$ represents noise contributions collectively and k may be sensor index (e.g., index of electromagnetic sensors 20). Note that, in some embodiments, the source signal convolution matrix may be the same for all of the electromagnetic sensors 20.

As apparent to those of ordinary skill in the art, marine electromagnetic surveying may be used to map the electrical resistivity and/or conductivity of subsurface formations (e.g., formations 14 shown on FIG. 1). In the processing of electromagnetic data, it may be desired to calculate resistivity parameters as close to the actual resistivity parameters as possible or practicable. Accordingly, where d denotes (noisy) electromagnetic data from electromagnetic sensors 20, including the earth impulse response (e.g., the frequency response), I denotes other relevant background information (e.g., source sequence, seismic data, well logs geological information, etc.), and m denotes subsurface resistivity parameters, it may be desired to find a method M that determines the resistivity parameters as close to the actual resistivity parameters as possible or practicable, e.g., with minimum error. This general method M may represented by equation (16) below:

$$M(d,I) \to \hat{m} \quad (16)$$

However, because uncertainty may be inevitable due to noise and other factors, it may be desirable to have a method that also produces an uncertainty, as represented by equation (17) below:

$$M(d,I) \to (\hat{m}, \Sigma) \quad (17)$$

where $\Sigma$ may be the uncertainty in the estimate $\hat{m}$ of the subsurface resistivities. Accordingly, as may be apparent to those of ordinary skill in the art, the more relevant information that may be included in I, the better estimate $\hat{m}$ of the subsurface resistivities may be, i.e., closer to the actual resistivity parameters.

The process of going from electromagnetic data and background information to resistivity values may be divided into two steps commonly referred to as electromagnetic earth response estimation and inversion. Electromagnetic earth response estimation may also be referred to as processing. The two-step approach may outlined by the following equations:

$$M_g(d,I) \to (\hat{g}, \Gamma_g) \quad (18)$$

$$M_m(\hat{g}, \Gamma_g, I) \to (\hat{m}, \Sigma) \quad (19)$$

The electromagnetic earth response estimation step (shown as equation (18)) may use raw electromagnetic data and background information (d, I) to estimate electromagnetic earth responses (g) and produce an associated uncertainty metric ($\Gamma_g$). The inversion step (shown as equation (19)) may use the estimated electromagnetic earth responses (g) as the basis for the resistivity determination. By way of example, the inversion step may use updated values of the electromagnetic earth responses and/or the ambient noise to determine subsurface resistivities.

In the electromagnetic earth response estimation step, it may be desired to provide the best possible or practicable estimates of the electromagnetic earth responses and also a description of the inherent uncertainty. It may be understood that the representations provided herein in equations (15) to (19) are general and may comprise, for example, a fully specified probability distribution for the electromagnetic earth responses (g) that under some criterion results in an estimate of the electromagnetic earth responses ($\hat{g}$).

Embodiments disclosed herein may be directed to the improved techniques for electromagnetic earth response estimation. In particular, embodiments disclosed herein may be directed to inclusion of relevant information about noise and how to use this information to improve the estimation of the electromagnetic earth responses while also providing a relevant uncertainty metric. More particularly, embodiments may be directed to a method of joint estimation of electromagnetic earth responses and ambient noise that uses at least prior knowledge about the electromagnetic earth responses and ambient noise. Embodiments may use this prior knowledge of the electromagnetic earth response and ambient noise to estimate initial values of the electromagnetic earth response and ambient noise applicable to a marine electromagnetic survey. These initial values may then be applied to the acquired electromagnetic data to obtain a joint estimation of updated values of the electromagnetic earth responses and ambient noise. In contrast, current processing techniques may not incorporate detailed knowledge regarding electromagnetic earth responses and ambient noise in the estimation of the electromagnetic earth responses, only qualitative information may be used. Additionally, joint estimation of electromagnetic earth responses and ambient noise may not be used. Qualitative information usually comprises the fact that ambient noise may vary more rapidly than the electromagnetic earth responses and hence may be suppressed by averaging.

Joint estimation may be beneficial in providing better estimates of updated values of the electromagnetic earth responses, as electromagnetic earth responses and noise comprise the two major unknown contributions in electromagnetic data. In marine electromagnetic surveying, electromagnetic data may be acquired (for example, with a marine geophysical electromagnetic survey system 2 as illustrated in FIG. 1), which may be processed to obtain information about the earth's resistivity distribution, primarily in the subsurface. The data d from K electromagnetic sensors (e.g., electromagnetic sensors 20 on FIG. 1), acquired for N sampling times over an area may be disclosed by the parameters m, which determines resistivity. Each noisy sample may be expressed as:

$$d_{k,n} = [s_n \; s_{n-1} \; \ldots \; s_{n-M}] \begin{bmatrix} g_{k,n,0}(m) \\ g_{k,n,1}(m) \\ \vdots \\ g_{k,n,M}(m) \end{bmatrix} + v_{k,n}(a) + \alpha_{k,n}, \quad (20)$$

$$= s_n^T g_{k,n,-M}(m) + v_{k,n}(a) + \alpha_{k,n}, \quad (21)$$

where $d_{k,n}$: electric potential over sensor k, $s_n$ current through electromagnetic energy source 12 or the source signal, which may be measured sufficiently accurately such that it may be considered to be perfectly known, $g_{k,n}$ is the electromagnetic earth response, which may be unknown, $v_{k,n}$ is the ambient noise, which may also be unknown, $\alpha_{k,n}$ is the system measurement noise, n is the sampling index, k is the sensor index (e.g., index of electromagnetic sensors 20), a are the noise parameters, and m are the subsurface resistivity values. Because the electromagnetic earth response and the ambient noise may be both unknown, they both may be estimated. If the ambient noise, source signal, and the system measurement noise are known, then the electromagnetic earth response may be determined without excessive errors given that the source signal is chosen appropriately [see, e.g., *System Identification, Theory for the User*, Lennart Ljung, Prentice-Hall, 1987, ISBN 0-13-881640-9, pages 212-213 and 361-364].

From equations (20) and (21), it may be seen that embodiments for estimating electromagnetic earth responses may be formulated to separate out the contribution of the ambient noise from the contribution of the electromagnetic earth response and source signal. Moreover, the more information about the electromagnetic earth response and ambient noise that may be incorporated, the better they may be separated out in the estimation. For example, one such piece of information is that the noise may contain a significant swell peak around 0.1 Hz (in certain acquisition scenarios) while the electromagnetic earth responses may be smooth in that frequency range.

As disclosed below, in an effort to suppress noise and provide better estimates of the electromagnetic earth responses, the estimation of electromagnetic earth responses and the ambient noise may be combined using several procedures that may make use of models for both the electromagnetic earth response and ambient noise. Procedures may comprise a general joint estimation method and a recursive scheme.

In some embodiments, general joint estimation method may be one technique for separating out the ambient noise contribution from the contribution of the electromagnetic earth response and source signal. General joint estimation may rely on a probability theory for inference and compute the posterior probability distribution for the entities of interest as follows:

$$p(g, v | d, I) = p(g, v | I) \frac{p(d | g, v, I)}{p(d | I)} \quad (22)$$

where $p(g,v|d,I)$ is the joint posterior probability distribution for the electromagnetic earth response(s) g and the ambient noise v, $p(g, v|I)$ is the joint prior (pre-data) probability distribution for the electromagnetic earth response(s) g and the ambient noise v, $p(d|g,v,I)$ is the likelihood for the electromagnetic earth response(s) g and the ambient noise v (the probability distribution for the data, given the response(s) and noise), $p(d|I)$ is the prior probability distribution for the data d, d is the recorded electromagnetic potential data, $p(\cdot)$ is denoting a probability distribution, g is the electromagnetic earth response(s), v is the ambient noise, and I is the (relevant) background information. Note that g may be one response (one electromagnetic sensor 20 at one position), a subset of responses (e.g. one electromagnetic sensor 20 with multiple shots), multiple responses for a line or survey, or any other combination. The computation of this posterior probability distribution using the background information I, would then constitute an operator $M_g(d,I)$ that may be input into the inversion step. The prior probability distribution $p(g,v|I)$ may contain initial estimates of the electromagnetic earth response and ambient noise based on prior information I without invoking data. The so-called likelihood, $p(d|g,v,I)$, comprises the measurement equation and knowledge about the system measurement noise, and $p(d|I)$ is a normalizing constant.

In some embodiments, the joint posterior probability distribution $p(g,v|d,I)$ may have to be reduced to a single estimate $(\hat{g},\hat{v})$ and a simplified uncertainty metric $(\hat{\Gamma}_g, \hat{\Gamma}_v)$, depending on the methods used for resistivity determination or the general use of the estimates. One embodiment may be to use the mean values and the covariance matrices, but other alternatives are possible. In general terms, an estimate may be obtained, some embodiments, by minimizing a criterion (a loss function) applied to the posterior probability distribution. Yet other embodiments may obtain the estimates directly without calculating the posterior probability distribution, for example by postulating the joint estimate as a linear combination of the data and minimizing the expected quadratic error.

Equation (22) may show the combination of prior information and electromagnetic data in the probabilistic framework. Even if the probabilistic framework is not used explicitly, one particular embodiment may incorporate prior information to enable the joint estimation to optimally separate the electromagnetic earth responses from the noise. The prior information may be concretized as models (e.g. parameterized noise spectra), constraints (e.g. maximum response amplitudes), probability distributions, etc. For joint estimation, embodiments may include information that set electromagnetic earth responses apart from ambient noise, for example, differences in spectral properties. Another embodiment of concretization may be the initial estimates used in specific methods such as recursive estimation where estimates are updated in steps when data is incorporated piece by piece. Consider the situation before data may be incorporated. From prior information such as well logs from nearby locations, legacy noise recordings, etc., an initial estimate $(\hat{g}_0,\hat{v}_0)=M(I)$ may be formed. When the first data point is incorporated (or the first block of data, or the whole dataset) the method may update to $(\hat{g}_1,\hat{v}_1)=M(d_1,I)=F((\hat{g}_0, \hat{v}_0), d_1, I)$ where F may be the recursive operator combining previous estimate, data and other prior information.

In some embodiments, the joint estimation may be complemented with a so-called marginalization step in which the estimates of the electromagnetic earth responses may be averaged over the possible range of ambient noise contributions. In probabilistic terms, the marginalization step may include averaging over the noise uncertainty as follows:

$$p(g|d,I)=\int p(g,v|d,I)dv \quad (23)$$

but other implementations may be possible. For example, an additional embodiment may include averaging numerical results of joint estimations under a range of constraints allowed by the information. It should be understood that the marginalization step may improve robustness to noise uncertainties.

In some embodiments, joint estimation may also be applied on a model level for the ambient noise. Prior information may include the spectral properties of the ambient noise in terms of a family of noise covariance matrices $R_v$ (a) where the parameter vector a encodes the noise properties. For example, one set of parameter values may encode normal noise levels for a certain weather window while another set of parameter values also encodes the presence of strong swell noise (typically a noise peak at around 0.1 Hz). Consider the data equation (20), repeated here $$d=S^Tg+v(a) \quad (24)$$

in simplified form. For a given value of a the standard least squares estimate of g is given by the following equation:

$$\hat{g}=(SR_v^{-1}(a)S^T)^{-1}SR_v^{-1}(a)d \quad (25)$$

but when a is not known exactly, the estimates may not well-defined. An example of a joint estimation scheme may be devised to estimate (g,v), but it may also possible to devise a joint method to estimate (g,a) in alternative embodiments. To understand how joint estimation may improve the estimate of the electromagnetic earth response and the ambient, consider the following: Assume a may be determined approximately by prior information and the most likely value $a_0$ which may represent noise without a swell peak may be used. If the actual data includes a swell peak (in the noise v(a)), the least squares estimate above may be distorted by trying to match g to the peak. Alternatively, if the whole range of noise properties allowed by prior information (including an a corresponding to swell noise) may be considered and g and a may be jointly estimated, then the best joint match to the electromagnetic data may be more likely to occur for the noise parameters that includes swell and thus reduces the distortion in the estimate of g.

In some embodiments, a recursive method may include data samples one-by-one and/or subset-by-subset, not necessarily the whole dataset at once. In some embodiments, a joint recursive method for estimation of electromagnetic earth responses and ambient noise may produce a sequence of estimates $\{(\hat{g}_n, \hat{v}_n)\}$ for the recursive steps n. In some embodiments, the processing of the electromagnetic data may include a joint recursive method in which the probability distributions of the electromagnetic earth responses and the ambient noise may be recursively updated using electromagnetic data. To implement a recursive method, the electromagnetic earth responses and ambient noise in one step may be coupled to the electromagnetic earth responses and ambient noise in next step, and this may be commonly known as a prediction step (e.g., given the information up to step n, data and prior information, what may be the prediction for the next step).

Figure 3:
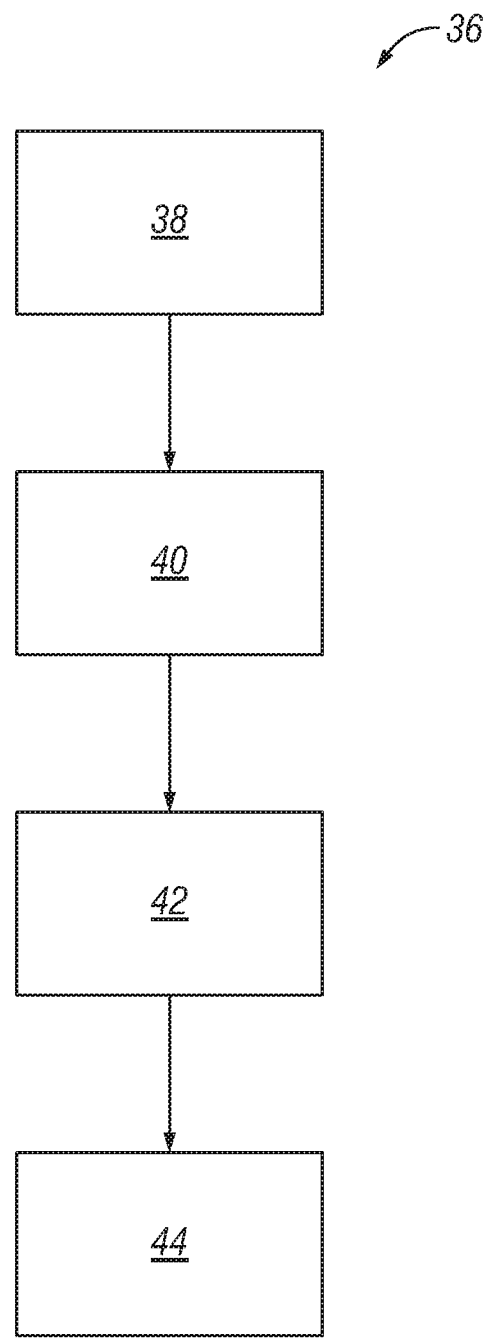
FIG. 3 illustrates a flow chart of an example embodiment of a recursive scheme.

FIG. 3 illustrates a flow chart of a recursive method 36. As illustrated, a recursive method 36 may include, but is not limited to, model building 38, initialization 40, forward recursion 42, and/or backward recursion 44. A recursive method 36 may begin with model building 38. Model building 38 may comprise using prior information such as, but not limited to, old data, well logs, general geophysical information, and/or electromagnetic modeling software which may be used to construct models of electromagnetic earth responses and noise. For example, the spatial rate of change of electromagnetic earth responses, the spectral characteristics of the noise and the electromagnetic earth responses and noise may relate to the measured electromagnetic data. Initialization 40 may use the built model and prior information to make an initial estimate of the electromagnetic earth response and ambient noise, including the estimates' uncertainty. The results may provide a prediction which may be used to refine model building 38. Using forward recursion 42, for every step n, in which a subset of the electromagnetic data may be processed, the existing initial estimate (the prediction from the previous step) may be updated using the prediction data. This step may involve the weighting of electromagnetic data and prediction using their respective accuracy (uncertainty). The electromagnetic data may be able to improve the prediction to a more accurate estimate. Backward recursion 44 may be used after estimates and related uncertainties are computed in the forward recursion 42, the process may be run data backward through the model to improve and/or verify accuracy.

In some embodiments, a recursive method (e.g., recursive method 36 on FIG. 3) may include use of a Kalman filter. In some embodiments, the electromagnetic data may processed with the Kalman filter. If the initial estimates use Gaussian formulations, i.e. given as a mean value and a covariance, and the prediction and measurement models are linear, the optimal estimation method may be shown to be the Kalman filter. It may follow that the recursive method may use specific matrix equations that propagate the Gaussian parameters through the forward and backward recursions.

Figure 4:
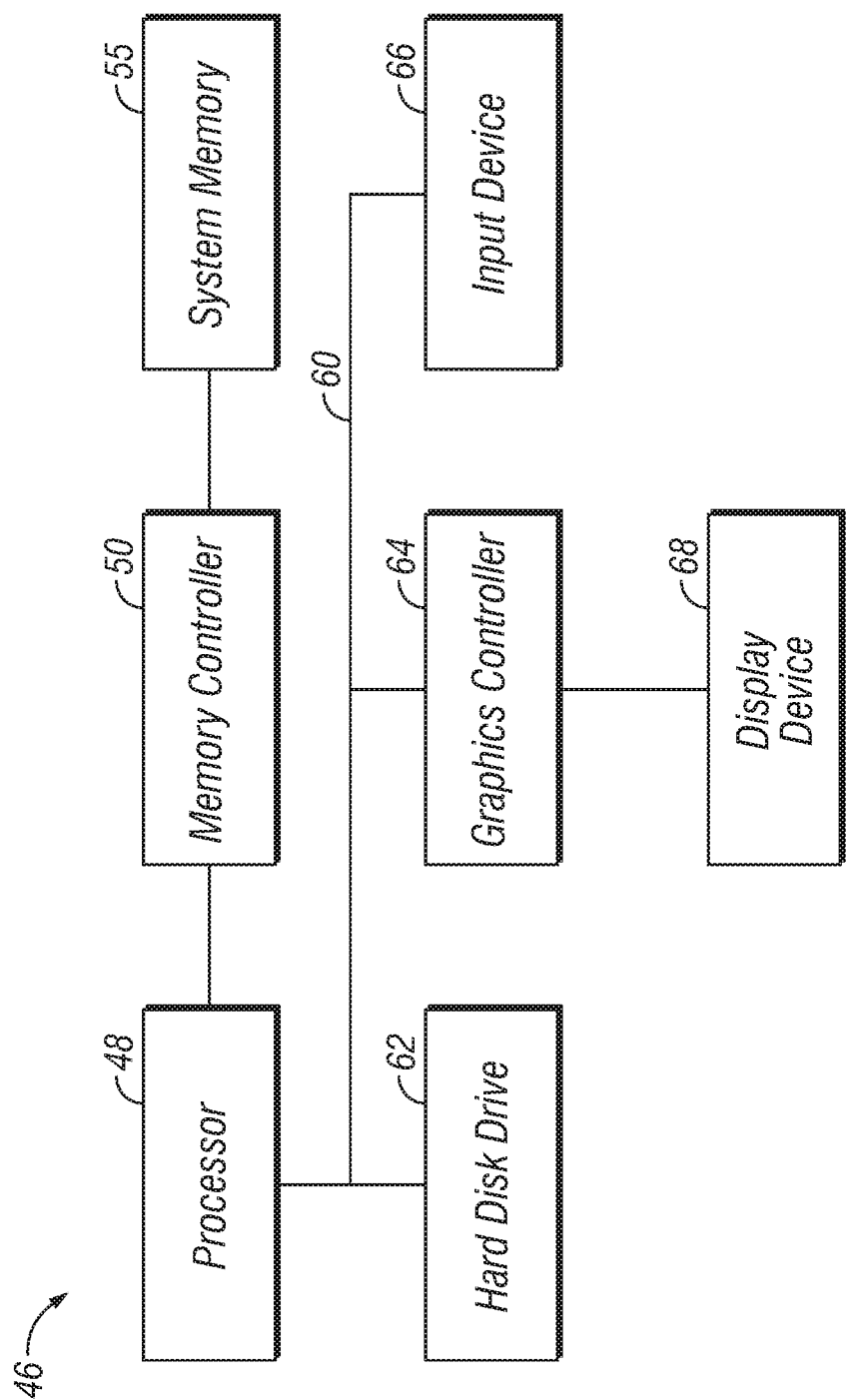
FIG. 4 illustrates an example embodiment of a data processing system.

FIG. 4 illustrates one embodiment of a data processing system 46 that may be utilized in accordance with embodiments of the present invention. In some embodiments, the data processing system 46 may be a component of the recording system 8 (e.g., FIG. 1). The data processing system 46 may be used for implementation of the previously described techniques for the joint estimation of electromagnetic earth responses and ambient noise. Special or unique software for receiving the inputs, data processing, and sending output signals may be stored in the data processing system 46 and/or on external computer readable media. Those of ordinary skill in the art will appreciate that the data processing system 46 may comprise hardware elements including circuitry, software elements including computer code stored on a non-transitory, tangible machine-readable medium or a combination of both hardware and software elements. Additionally, the blocks shown on FIG. 4 are but one example of blocks that may be implemented. A processor 48, such as a central processing unit or CPU, may control the overall operation of the data processing system 46. The processor 48 may be connected to a memory controller 50, which may read data to and write data from a system memory 55. The memory controller 50 may have memory that includes a non-volatile memory region and a volatile memory region. The system memory 55 may be composed of a plurality of memory modules, as will be appreciated by one of ordinary skill in the art. In addition, the system memory 55 may include non-volatile and volatile portions. A system basic input-output system (BIOS) may be stored in a non-volatile portion of the system memory 55. The system BIOS is adapted to control a start-up or boot process and to control the low-level operation of the data processing system 46.

The processor 48 may be connected to at least one system bus 60 to allow communication between the processor 48 and other system devices. The system bus 60 may operate under a standard protocol such as a variation of the Peripheral Component Interconnect (PCI) bus or the like. In the example embodiment shown in FIG. 4, the system bus 60 may connect the processor 48 to a hard disk drive 62, a graphics controller 64 and at least one input device 66. The hard disk drive 62 may provide non-volatile storage to data that may be used by the data processing system 46. The graphics controller 64 may be in turn connected to a display device 68, which may provide an image (either volatile or reduced to tangible form) to a user based on activities performed by the data processing system 46. The memory devices of the data processing system 46, including the system memory 55 and the hard disk drive 62 may be tangible, machine-readable media that store computer-readable instructions to cause the processor 48 to perform a method according to an embodiment of the present techniques.

Therefore, the present disclosure may well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as disclosed in the claims below. It is therefore evident that the particular illustrative embodiments disclosed above may be altered or modified and all such variations are considered within the scope and spirit of the present disclosure. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification may be adopted for the purposes of understanding this disclosure.

What is claimed is:

1. A method for estimation of electromagnetic earth responses for a marine electromagnetic survey, comprising:
   estimating initial values of the electromagnetic earth responses and ambient noise applicable to the marine electromagnetic survey without invoking collected electromagnetic data from the marine electromagnetic survey; and
   performing a forward recursion on the initial values of the electromagnetic earth responses and the ambient noise to correct the initial values of the electromagnetic earth response and ambient noise;
   performing a backward recursion on the corrected initial values of the electromagnetic earth responses and the ambient noise;
   performing a joint estimation of electromagnetic data and the corrected initial values of the electromagnetic earth responses and the ambient noise to obtain a joint estimation of updated values of the electromagnetic earth responses and the ambient noise, wherein the electromagnetic data was acquired with one or more electromagnetic sensors, wherein the electromagnetic data contains measurements of an electromagnetic field.

2. The method of claim 1, further comprising averaging the initial values of the electromagnetic earth responses over a range of ambient noise contributions.

3. The method of claim 1, wherein the performing a joint estimation comprises recursively updating probability distributions of the electromagnetic earth responses and the ambient noise using the electromagnetic data.

4. The method of claim 1, wherein the performing a joint estimation comprises is performed with a Kalman filter.

5. The method of claim 1 further comprising producing a geophysical data product from at least the joint estimation of the updated values.

6. The method of claim 5, further comprising storing the geophysical data product on a tangible, non-volatile machine-readable medium suitable for importing onshore.

7. The method of claim 6, further comprising importing the geophysical data product onshore and performing further data processing or geophysical analysis on the geophysical data product.

8. The method of claim 1, wherein the joint estimating is performed for electromagnetic earth responses and parameters related to the ambient noise.

9. The method of claim 1, further comprising acquiring the electromagnetic data for the marine electromagnetic survey using the electromagnetic sensors.

10. The method of claim 9, wherein the electromagnetic sensors are disposed on a receiver array that is at least one of located on a streamer towable by a survey vessel, located on an ocean bottom cable, or fixed at or near a water bottom.

11. The method of claim 9, further comprising activating an electromagnetic energy source to generate the electromagnetic field.

12. A system, comprising
   a data processing system configured to at least: (i) estimate initial values of electromagnetic earth responses and ambient noise applicable to a marine electromagnetic survey without invoking collected electromagnetic data from the marine electromagnetic survey; (ii) perform a forward recursion on the initial values of the electromagnetic earth responses and the ambient noise to correct the initial values of the electromagnetic earth response and the ambient noise; and (iii) perform a joint estimation of electromagnetic data measured using the electromagnetic sensors and the corrected initial values of the electromagnetic earth responses and the ambient noise to obtain a joint estimation of updated values of the electromagnetic earth responses and the ambient noise.

13. The system of claim 12, further comprising a receiver array, wherein the receiver array comprises a plurality of longitudinally spaced electromagnetic sensors, and wherein the electromagnetic sensors measure electromagnetic data from an electromagnetic field.

14. The system of claim 12, wherein the data processing system is configured to determine subsurface resistivities using at least the updated values of the electromagnetic earth responses.

15. The system of claim 12, wherein the data processing system is configured to use a Kalman filter in the processing the electromagnetic data.

16. The system of claim 12, wherein the receiver array is configured to be at least one of located on a streamer towable by a survey vessel, located on an ocean bottom cable, or fixed at or near at a water bottom.

17. The system of claim 12, wherein the data processing system is configured to not use the electromagnetic data from the electromagnetic sensors in the estimation of the initial values.

18. The system of claim 12, wherein the electromagnetic sensors comprise at least one of receiver electrodes or magnetometers.

19. A non-transitory machine-readable medium storing instructions executable by a processing resource to cause the machine to:
   estimate initial values of electromagnetic earth responses and ambient noise applicable to a marine electromagnetic survey without invoking collected electromagnetic data from the marine electromagnetic survey;
   perform a forward recursion on the initial values of the electromagnetic earth responses and the ambient noise to correct the initial values of the electromagnetic earth response and ambient noise; and
   perform a joint estimation of electromagnetic data from the marine electromagnetic survey and the corrected initial values of the electromagnetic earth responses and the ambient noise to obtain a joint estimation of updated values of the electromagnetic earth responses and the ambient noise, wherein the electromagnetic data was acquired with one or more electromagnetic sensors, wherein the electromagnetic data contains measurements of an electromagnetic field.

20. The non-transitory machine-readable medium of claim 19, wherein the instructions further cause the machine to recursively update probability distributions of the electromagnetic earth responses and the ambient noise in the processing the electromagnetic data.

21. The non-transitory machine-readable medium of claim 19, wherein the instructions further cause the machine to use a Kalman filter in the processing the electromagnetic data.

22. The non-transitory machine-readable medium of claim 19, wherein the instructions further cause the machine to extract prior probability distribution using Gaussian formulations in the estimation of initial values.

* * * * *